April 12, 1955

H. M. STIEGLITZ 2,706,127

COVER FASTENING MEANS

Filed Aug. 7, 1952

Henry M. Stieglitz,
Inventor,
Bruninga and Sutherland,
Attys.

April 12, 1955  H. M. STIEGLITZ  2,706,127
COVER FASTENING MEANS
Filed Aug. 7, 1952  2 Sheets-Sheet 2

Henry M. Stieglitz,
Inventor,
Bruninga and Sutherland,
Attys.

United States Patent Office 2,706,127
Patented Apr. 12, 1955

2,706,127

COVER FASTENING MEANS

Henry M. Stieglitz, St. Louis, Mo., assignor to Frank Adam Electric Company, St. Louis, Mo., a corporation of Missouri Application August 7, 1952, Serial No. 303,122

3 Claims. (Cl. 292—256.73)

This invention relates to electrical cabinet constructions, and more particularly to front attaching devices and corner fasteners in cabinets for electrical equipment.

Heretofore, it has been general practice in the manufacture of metal cabinets for electrical equipment to provide inturned flanges at the front opening of the box so that a front or cover may be attached by screws threaded into these flanges. Although such a cabinet construction is satisfactory from the viewpoint of the Underwriter's Laboratories requirements, the manufacturing expense is considerable, and there may be difficulties presented in the attachment of the front panel, particularly where the cabinet box is to be embedded within a wall of a building. It is accordingly an object of this invention to reduce the cost of electrical cabinets, while meeting the requirements of the Underwriter's Laboratories and avoiding difficulties in the attachment of a front cover.

More particularly, in United States Patent No. 1,915,509 and in my Patent No. 2,642,004 issued July 28, 1953, there are shown devices for facilitating the attachment of a front panel to a front-flanged cabinet box. As pointed out, the cabinet box containing the desired electrical equipment may be embedded in the wall of the building, and the cabinet front is applied as a part of the trim within the building. The aforementioned disclosures relate to panel attachment devices having floating screw-receiving elements cooperable with front flanges along the edges at the front of the box, whereby an overhanging front panel may be symmetrically positioned with respect to the other trim of the building, although the cabinet may be out of plumb, and whereby attachment of the front panel is facilitated when the cabinet has been distorted. It is an object of this invention not only to provide the advantages of the above disclosures, but to provide these advantages in a less costly electrical cabinet. Specifically, the invention provides for the elimination of inturned flanges about the front opening of a cabinet box, it being understood that the omission of these flanges from small cabinet boxes permits a considerable reduction in the cost of the cabinet.

An additional object of this invention is to provide in combination with the front attachment feature, a corner fastener for inexpensively securing together and bracing the margins of the side and end panels at the corners of the box, which margins were heretofore overlapped and riveted pursuant to the requirements of the Underwriter's Laboratories. The invention not only contemplates the elimination of rivets, but further contemplates the elimination of overlapping flanged corners in low-cost boxes, such as outlet boxes, while meeting the Underwriter's Laboratories requirements of a corner fastening. Moreover, the invention permits the manufacture, with one punching die, of several depths of boxes with the proper number of fasteners, as determined by the size of the box.

To the attainment of these objectives, I provide a cabinet box having an open front over which a front cover is to be secured, the box having side and end panels folded over from a back with the margins thereof forming the corners of the box. Flat corner brackets, one or more to the corner, are located adjacent to but offset inwardly from the front of the box, and the brackets are provided with right-angular edges seated within the corners and with ears entered through the margins of the side and end panels to secure the panels and the brackets. With this arrangement, other corner fastening means need not be provided, and the corners of the box need not be flanged or overlapped, although the invention also contemplates the provision of boxes with overlapped flanged corners.

A front cover attachment is provided by a floating screw-receiving element which is carried on a corner bracket. The flat bracket is formed with a recess between its right-angular edges and with a large opening adjacent thereto. The screw-receiving element is formed with a tapped leg slidably engaging the back face of the bracket, a retaining leg engaging the other face of the bracket, and a connecting loop. The arrangement is such that the connecting loop is loosely accommodated within the recess of the bracket, and the large opening in the bracket overlies the tapped screw hole to permit lateral movement of a front attaching screw. As such, the front attachment permits the elimination of inturned flanges about the front opening with a consequent reduction in the cost of the cabinet. In cabinets having large front openings, similar attachment devices may be provided along the sides of the box as well as at the corners.

Other features of the invention will be in part apparent from and in part pointed out in the following detail description taken in conjunction with the accompanying drawings in which.

Figure 1:
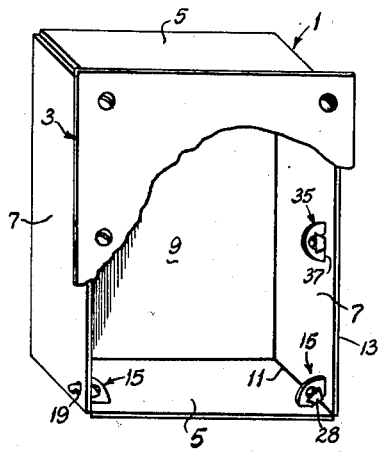
Fig. 1 is an oblique view of a cabinet box of this invention showing a part of an overhanging cover therefor.

In Fig. 1 of the drawings, there is shown an open-front cabinet box generally designated 1 and an over-hanging front cover 3 therefor. This cabinet is particularly useful as a low-cost outlet box for electrical connections. For example, electrical conductors may be entered through suitable openings (not shown) in the sides, back or ends of the box, and electrical connections may be made to suitable apparatus mounted within the box through suitable openings (not shown) in the front cover 3. The provision of such openings is well-known in the art.

The box 1 is formed from a blank of sheet metal with side panels 5 and end panels 7 folded over from a back 9, so that the edges along the side and end panels meet at 11 to form the corners of the box and define a flangeless front 13. These side and end panels are marginally secured adjacent the front 13 by means of corner fastening brackets generally designated 15, which may also function as attachment devices for a front cover 3, to be secured in place by screws 14.

Figure 2:
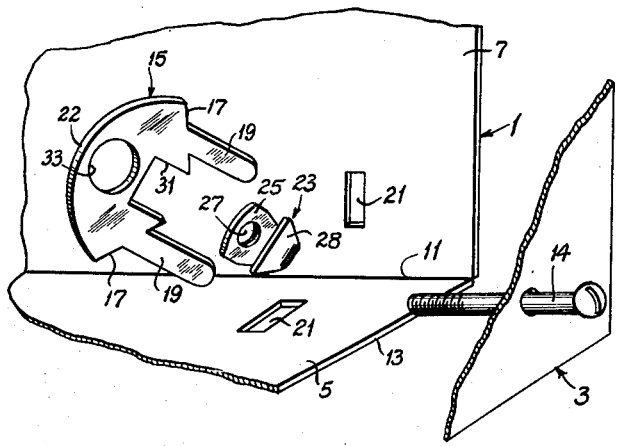
Fig. 2 is an enlarged exploded view showing the corner construction of Fig. 1 in greater detail.
Figure 3:
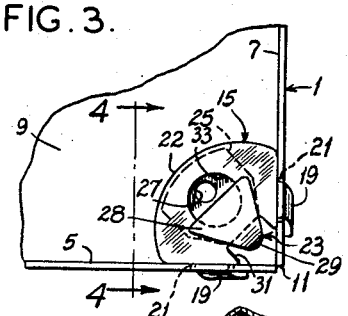
Fig. 3 is an enlarged front view of the corner of the Fig. 1 cabinet box, the cover being removed.
Figure 4:
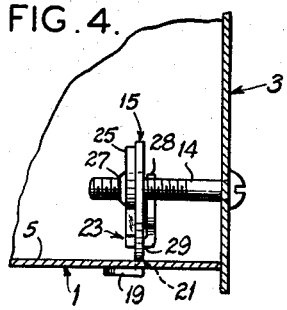
Fig. 4 is a section taken on the line 4—4 of Fig. 3 showing the cover in place.

Referring now more particularly to Fig. 2 of the drawings, the corner fastening bracket 15 is a sheet-metal stamping having right-angular edges 17 from which extend oblique ears 19. A pair of slotted openings 21 are punched at the corners of the box adjacent to, but spaced inwardly from, the front edges 13 thereof. The ears 19 are arranged parallel to one another in order to slip through the openings 21, and the ears are peened over on the outer surface of the box with the right-angular edges 17 seated firmly in the corners. The shape of the bracket is such as to permit the peening over of the ears 19 by impact at 22 on the curved edge of the bracket. When so secured, the brackets 15 function as corner braces and as attachments between the margins of the side panel 5 and the end panels 7.

The brackets 15 also serve as an anchorage for a floating screw-receiving element 23 by means of which the cover is secured in place. The screw-receiving elements generally designated 23 are each formed as a clip with a leg 25 having a tapped hole 27 for threaded cooperation with one of the screws 14. This leg 25 is slidably seated upon the back face of the flat bracket 15, and is retained thereon by a relatively shorter retaining leg 28, which extends over the front face of the bracket from a connecting loop 29. Between the edges 17 there is a recess 31, which loosely accommodates the part 29 of the screw-receiving element 23. Adjacent the recess 31, the bracket is provided with a large opening 33, which overlies the comparatively small tapped hole 27 in the leg 25. The connecting part 29 is relatively narrow as compared with the width of the legs 25 and 28, which taper outwardly in order to provide for a secure anchorage with the face of the bracket while also permitting substantial movement of the tapped hole 27 about the larger overlying opening 33. With the arrangement, a screw 14 extending through the opening 33 is laterally movable in any direction a substantial amount.

Figure 5:
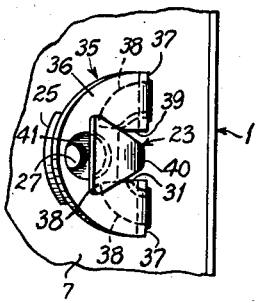
Fig. 5 is an enlarged oblique view showing a side fastener of Fig. 1 in greater detail.

In Figs. 1 and 5 there is shown a similar front-attachment device 35 for use between corners of the cabinet. It will be understood that in cabinets with large front openings, it may be necessary to provide front cover attachments in addition to those at the corners. The device 35 includes a bracket 36 which is essentially similar to the bracket 15 described above but has aligned edges 37 in lieu of the right-angular edges of the bracket 15. As before, the bracket 36 is secured inwardly from the front edge by ears 38 entered through the side panels 7 and peened over. A recess 39 is provided between the ears to accommodate a part 40 of a screw-receiving element 38, which element is identical to the element 23 described previously. As shown, the bracket also includes the relatively large opening 41 for loosely accommodating one of the screws 14.

It will be apparent the electrical box described above may be readily manufactured with considerably less expense than boxes having a flanged front and overlapped flanged margins at the corners. In other words, the brackets 15 combine in one element the front flanges, the overlapping corner flanges and the corner fastening rivets of prior boxes of this type. Additionally, the box may be embedded in a wall of a building and an overhanging cover applied with substantial lateral play so that the cover may be neatly aligned with the trim of the building. This lateral movement is also desirable where the box is distorted out of its original shape as by abuse in handling. Moreover, the inwardly offset arrangement of the front attachments permits the use of flanged or centrally depressed covers, which are known in the art.

Figure 6:
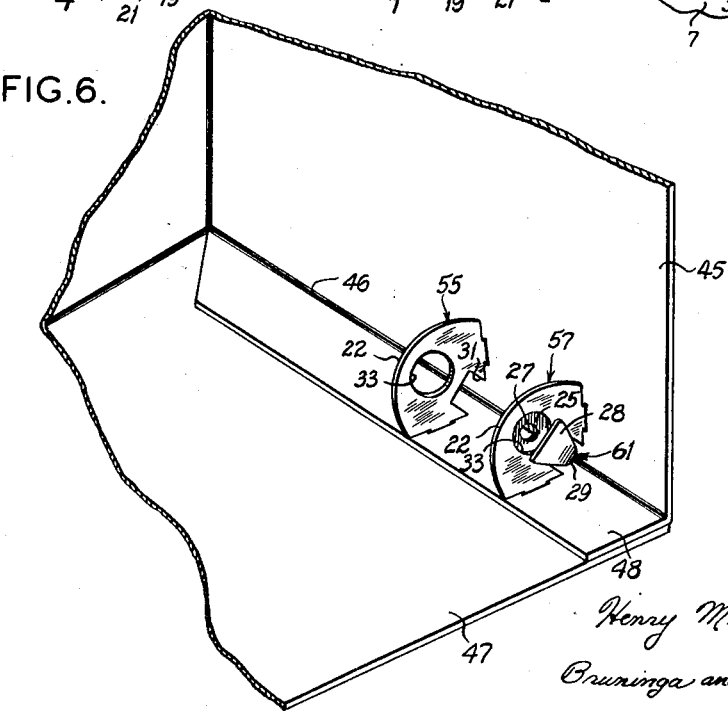
Fig. 6 is an oblique view of part of a cabinet box showing an alternative embodiment of the invention wherein two fasteners are employed at the corner and wherein the corner of the cabinet is formed with overlapped flanged margins.

In the embodiment shown in Figs. 1–4, the corner fastening brackets 15 are spaced approximately five-eighths of an inch from the front edge 13 of the box, and only one fastening bracket is provided at a given corner. Although this single corner fastener is permitted, and indeed may be required for shallow boxes, as for example, box of depth not greater than four inches, additional corner fasteners are needed in deeper boxes. Moreover, in cutout and panelboard cabinets, the Underwriter's Laboratories require an overlapped flanged corner construction. Fig. 6 illustrates an embodiment of the invention for such larger cabinet boxes.

Figure 7:
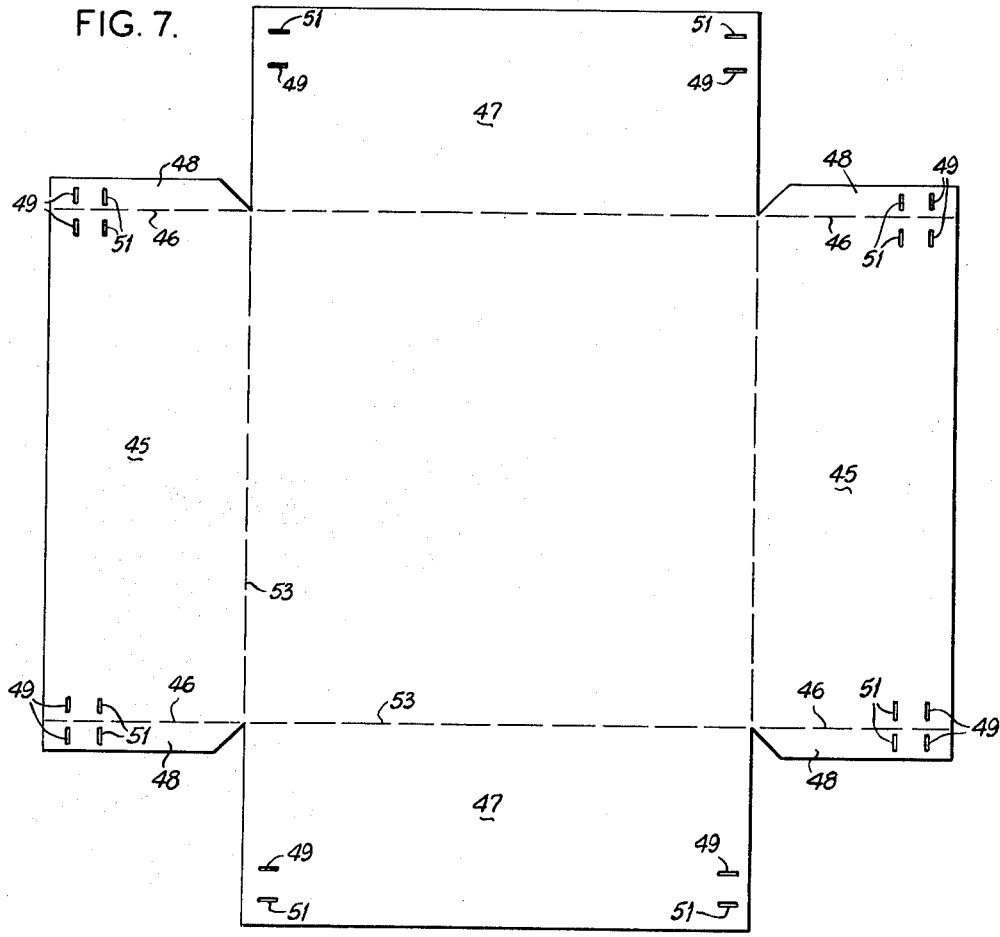
Fig. 7 is a plan view of a blank for making the cabinet disclosed in part in Fig. 6.

As before, the cabinet box of Fig. 6 is formed from a sheet metal blank by folding over extensions (Fig. 7) to form side and end panels 45 and 47, but in this instance, the side panels 45 have their end margins folded over along lines 46 to form flanges 48. In order to reduce manufacturing costs, it is contemplated the slotted openings for the corner fastening brackets will be punched simultaneously by a single die, and this die will be used to punch blanks for boxes of several depths. The die is prepared to handle blanks for boxes of a depth up to five and five-eighths inches, and has a first set of outer slot-punches and a second set of punches spaced inwardly. The depth of the box is determined by the size of the blank placed upon the die, and the die automatically punches one or two sets of slots according to the size of the blank. Fig. 7 shows a blank for making a box of such depth as would require two fasteners at each corner, as for example, a box of four and three-fourths inches depth.

The punching die is constructed to punch out two sets of slotted openings 49 and 51, the inner set 49 being spaced three and three-eighths inches from the inner fold lines 53 of the extensions. The outer set of openings 51 is another three-fourths of an inch out or five-eighths of an inch in from the front edges of these extensions. When a box of four inches depth is to be manufactured, the same die may be employed as the punches for the outer set of slots will merely clear the outer edge of the shorter panel-forming extensions, and only the inner set 49 of slots will be punched.

The corner construction shown in Fig. 6 is the same as that described in connection with Fig. 2, except there are two brackets 55 and 57 at each corner of the box and the end panels 47 seat on the inturned flanges 48 of the side panels. Also, the flange 48 is punched so that its slots register with the slots in the end panels. The brackets 55 and 57 are identical to the brackets 15 described previously, however, only the forward bracket 57 need carry a screw-receiving element 61, which is also identical to the element 23.

Figure 8:
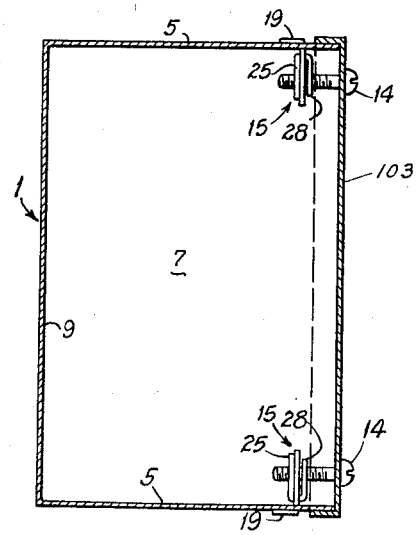
Fig. 8 is a vertical section of a cabinet box of the invention with a flanged front cover secured thereto.

Although Figs. 6 and 7 illustrate the corner flanges as being turned in from the side panels 45, it will be understood the invention is equally suited for a cabinet construction where the flanges are turned in from the end panels. Moreover, the front panel need not be a flat overhanging plate, as the inwardly offset brackets herein described permit the use of a flanged type of front panel 103, as illustrated in Fig. 8, or a cover having a depressed central portion. In this instance, there is little need for variation in the position of the cover, but as the same boxes are used with both types of covers, the invention offers advantages in simplifying production.

It will be understood that while the invention is particularly adapted to provide for elimination of the inturned flanges about the front of a cabinet box, the corner fastening and front attachment devices may be employed in conjunction with cabinets formed with inturned flanges at the front opening, the arrangement being such that the fastening screws extend inwardly from the side and end panels so as to clear inturned flanges, if any, at the front opening.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In an electrical cabinet box having a front opening over which a front panel is to be secured, the box having side and end panels with their margins forming the corners of the box, and fastening brackets fitted within the corners of the box, each bracket having ears entered through the margins of the side and end panels to secure the corners of the box, and the brackets being located adjacent to but inwardly offset from the front of the box to form an attachment for a front panel; the improvement comprising a floating screw-receiving element having a leg slidably engaging one face of the bracket and a retaining leg engaging the other face of the bracket, one of said legs having a tapped screw hole and the bracket having a substantially larger overlying opening for accommodating a laterally movable screw threaded into said leg.

2. In an electrical cabinet box, the improvement which comprises a corner bracket having edges seated within the corner of the box adjacent the front opening and a recess between said edges, spaced ears extending from said edges on opposite sides of the recess, said ears being entered through the walls of the cabinet box and being peened over, and a floating screw-receiving element carried by the bracket, the element having legs slidably engaging opposite faces of the bracket and a leg-connecting part loosely received within the recess in the bracket, one of said legs having a small tapped screw hole and the bracket having a substantially larger screw-accommodating opening overlying said screw hole.

3. The improvement of claim 2 further including a second similar corner bracket located inwardly with respect to the first bracket within a corner of the cabinet box.

References Cited in the file of this patent

UNITED STATES PATENTS

| 414,288 | Carpenter | Nov. 5, 1889 |
| 1,528,473 | Edwards | Mar. 3, 1925 |
| 1,676,298 | Stieglitz | July 10, 1928 |
| 2,400,270 | Tinnerman | May 14, 1946 |